(12) United States Patent
Oshikiri et al.

(10) Patent No.: US 7,454,540 B2
(45) Date of Patent: Nov. 18, 2008

(54) DATA TRANSFERRING SYSTEM AND ELECTRONIC APPARATUS

(75) Inventors: Koji Oshikiri, Miyagi (JP); Junichi Ikeda, Miyagi (JP); Koji Takeo, Miyagi (JP); Noriyuki Terao, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 46 days.

(21) Appl. No.: 11/332,203

(22) Filed: Jan. 17, 2006

(65) Prior Publication Data
US 2006/0171300 A1 Aug. 3, 2006

(30) Foreign Application Priority Data
Jan. 19, 2005 (JP) .................. 2005-011262

(51) Int. Cl.
*G06F 3/00* (2006.01)
(52) U.S. Cl. .................. 710/60; 710/52; 713/323
(58) Field of Classification Search .............. 710/5, 710/52, 105–106, 58, 60; 370/463; 713/323
See application file for complete search history.

(56) References Cited

U.S. PATENT DOCUMENTS 6,801,970 B2 * 10/2004 Riley et al. ............... 710/105
2004/0103333 A1 5/2004 Martwick et al.
2005/0248584 A1 11/2005 Takeo et al.
2005/0254085 A1 11/2005 Oshikiri et al.
2006/0168384 A1 * 7/2006 Radhakrishnan et al. ..... 710/260

FOREIGN PATENT DOCUMENTS

| EP | 1 700 190 A0 | 9/2006 |
| JP | 2002-229691 | 8/2002 |
| WO | WO 2005/066765 A2 | 7/2005 |

OTHER PUBLICATIONS

U.S. Appl. No. 10/937,284, filed Sep. 10, 2004.
Takashi Satomi, "Outline of the PCI Express Standard; The Standard of High Speed Extension Bus in Future", Interface, Chapter 4, Jul. 2003, pp. 80-93 (with English Translation).

* cited by examiner

*Primary Examiner*—Clifford H Knoll
(74) *Attorney, Agent, or Firm*—Oblon, Spivak, McClelland, Maier & Neustadt, P.C.

(57) ABSTRACT

A data transferring system based on the PCI Express standard in which power saving is realized is disclosed. In the data transferring system, a data transferring device transfers image data based on the PCI Express standard by synchronizing with a line synchronizing signal LSYNC. At this time, the data transferring device causes a period between packets (image data) to be transferred in one line cycle of the line synchronizing signal LSYNC to be shorter than a transition period "t1" which is required to transit from a link state L0 to a link state L0s and from the link state L0s to the link state L0. With this, the number of the transition periods "t1" is reduced and the period of the link state L0s is made long.

6 Claims, 20 Drawing Sheets

FIG.14

| LINK STATE | CONTENTS | TIME REQUIRING TO RETURN TO L0 |
|---|---|---|
| L0 | ACTIVE (NORMAL) | |
| L0s | LINK: COMMON MODE VOLTAGE CLOCK & MAIN POWER SOURCE: ON | 16ns–4 $\mu$s |
| L1 | LINK: COMMON MODE VOLTAGE CLOCK: OFF, MAIN POWER SOURCE: ON | 1–some10 $\mu$s |
| L2 | CLOCK: OFF, MAIN POWER SOURCE: OFF IF AUXILIARY POWER SOURCE (Vaux) EXISTS, POWER IS SUPPLIED | SYSTEM DEPENDANT |

RETURN TIME FROM L2 DEPENDS ON START-UP TIME OF POWER SOURCE AND PLL

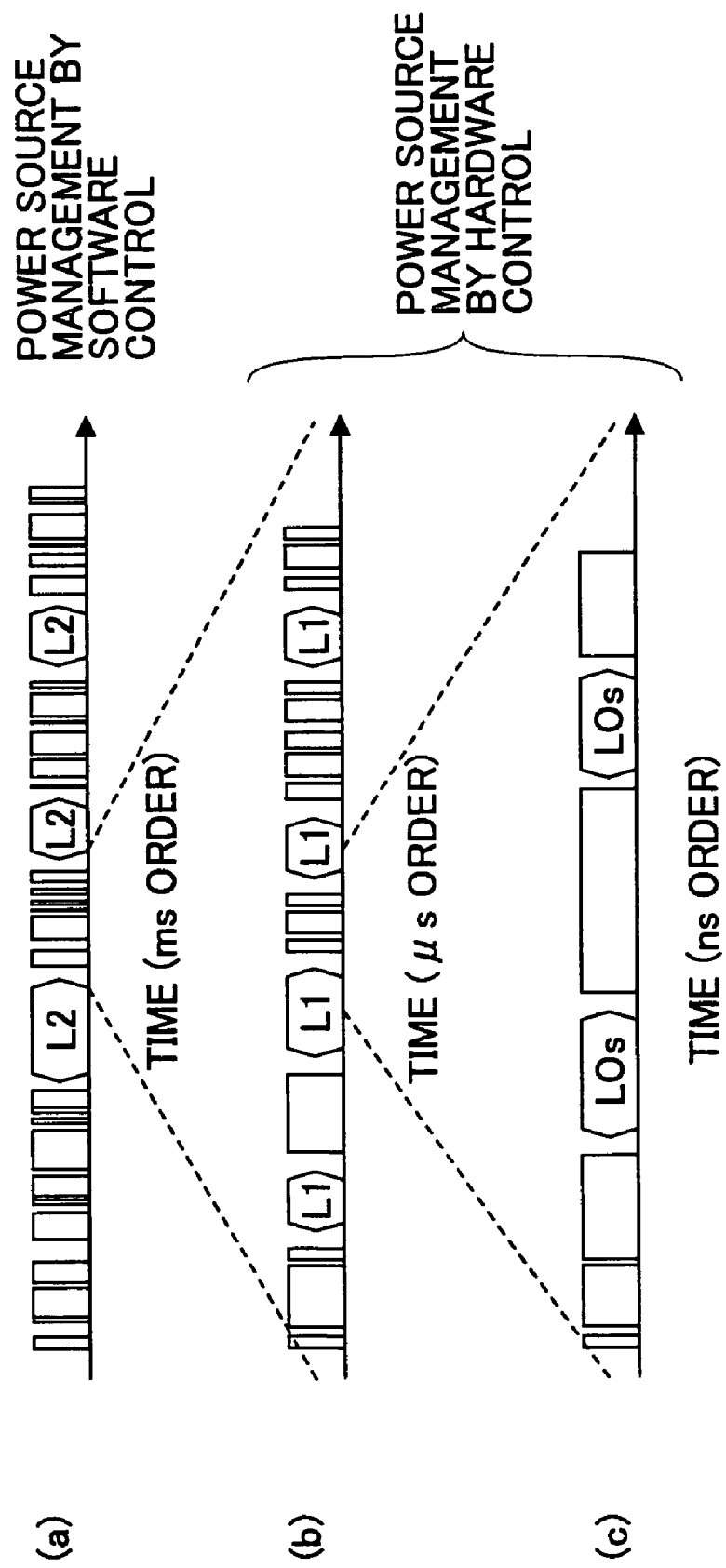

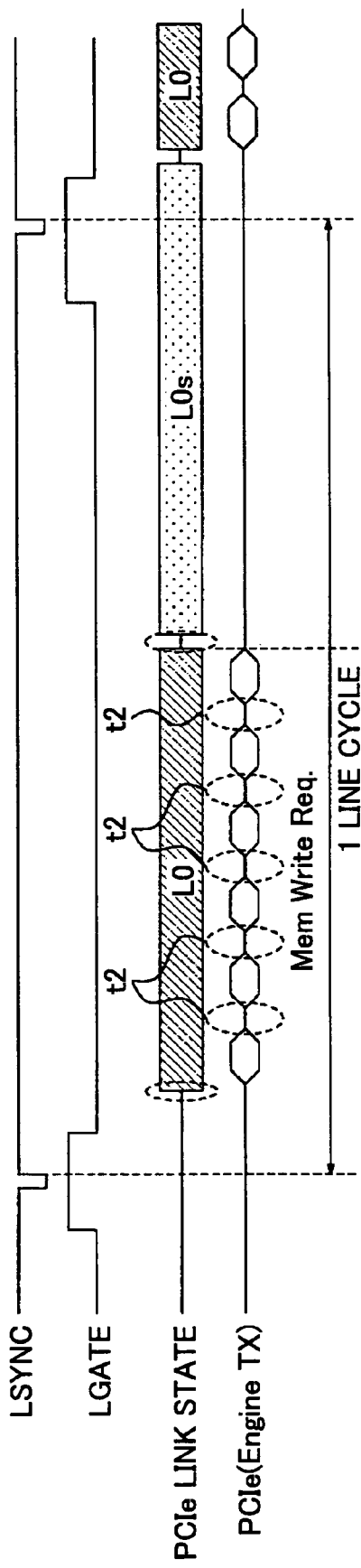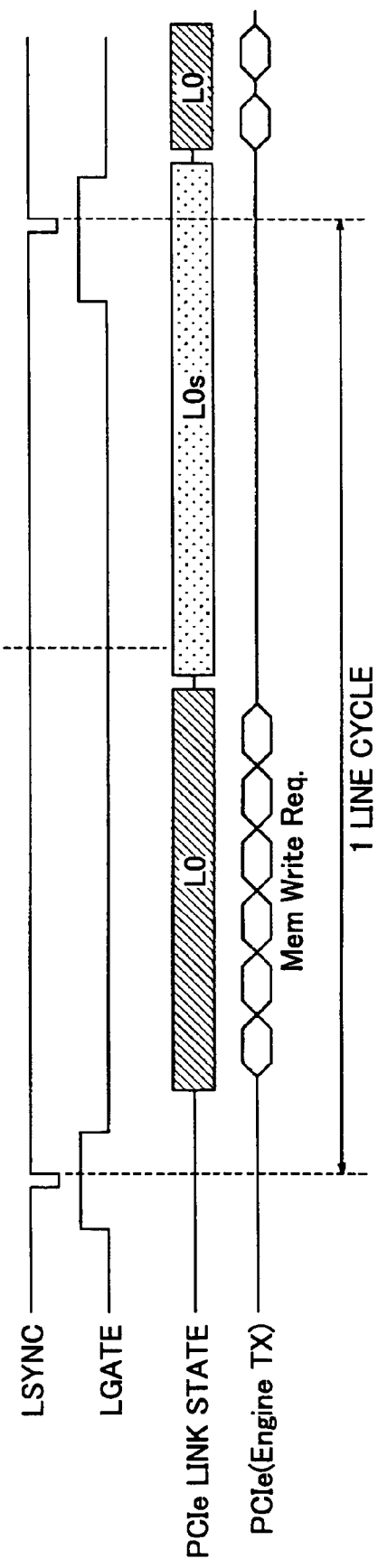

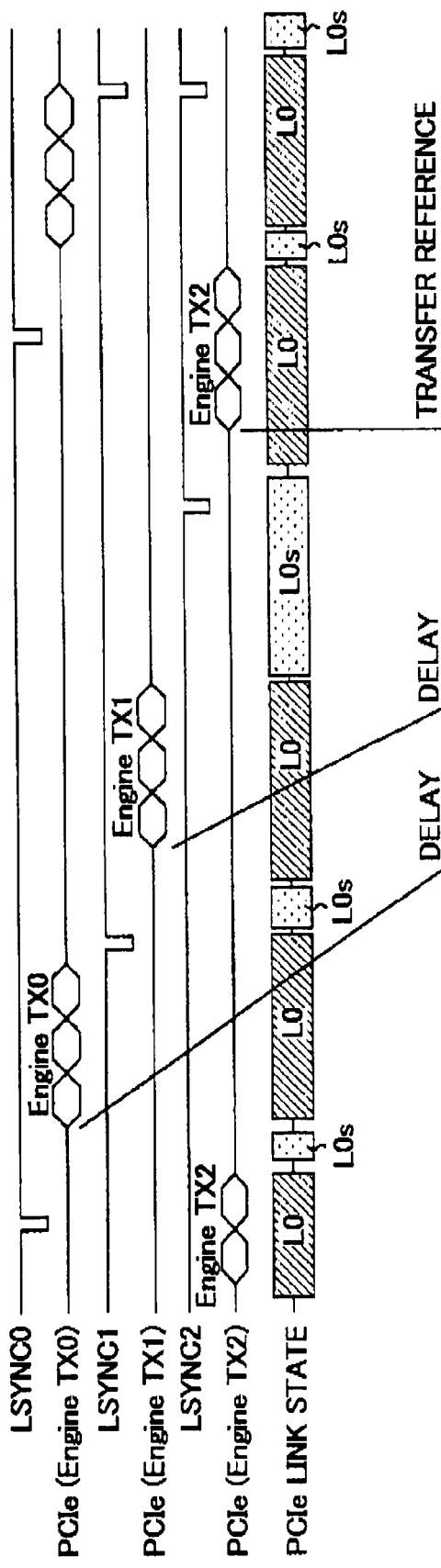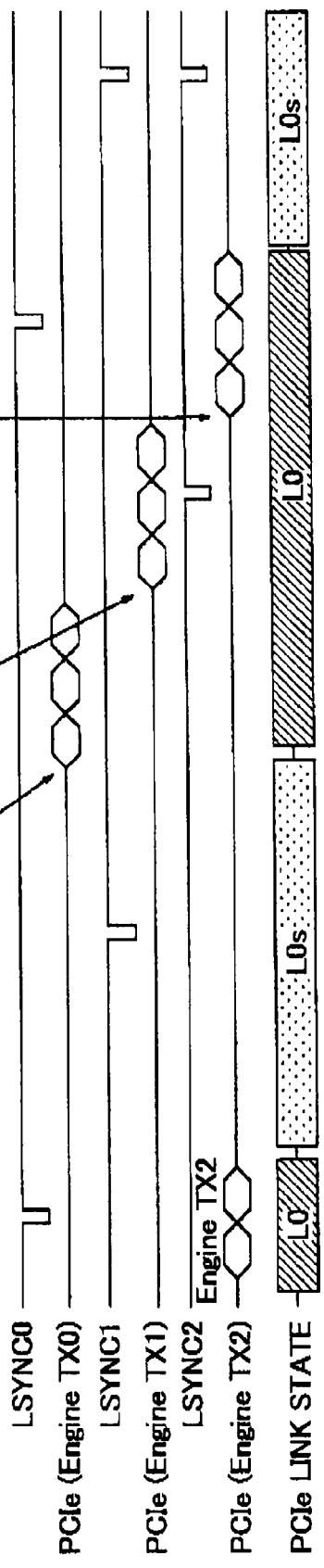
FIG.21A
FIG.21B

DATA TRANSFERRING SYSTEM AND ELECTRONIC APPARATUS

BACKGROUND OF THE INVENTION

1. Field of the Invention

The present invention generally relates to a data transferring system that transfers data and an electronic apparatus that provides the data transferring system.

2. Description of the Related Art

As a high speed serial interface, an interface called PCI Express (peripheral component interconnect express, registered trademark) being a successor of PCI is proposed (for example, refer to Non-Patent Document 1).

In PCI Express, in order to make the power consumption low, link states of L0, L0s, L1, and L2 are defined. The link state L0 is a normal mode and the power consumption is lowered corresponding to the change of the link state from L0s to L2. Details of the link states are explained below.

FIG. 15 is a timing chart showing a control example of power source management by the link states. In the link state L2 shown in FIG. 15 (a), a power saving mode is established in a ms order and power source management is executed by software control, and the period of the power saving mode is shown in "L2". In the link state L1 shown in FIG. 15(b), the power saving mode is established in a μs order and the power source management is executed by hardware control, and the period of the power saving mode is shown in "L1". In the link state L0s shown in FIG. 15(c), the power saving mode is established in a ns order and the power source management is executed by hardware control, and the period of the power saving mode is shown in "L0s".

Shifting to each of the power saving modes (link states) L0s, L1, and L2 from the link state L0 requires time, in addition, time is required to return to the link state L0 from the power saving modes (link states) L0s, L1, and L2. In the link state L0s which needs the shortest time to return to the link state L0 and the returning time is 16 ns to 4 μs.

[Non-Patent Document 1] Outline of the PCI Express Standard, Interface July 2003, written by Takashi Satomi However, as described above, in both cases of the shifting to each of the power saving modes from the link state L0 and returning to the link state L0 from each of the power saving modes, time is required. Therefore, even in the link state L0s in which the returning time to the link state L0 is the shortest, when the shifting and the returning are frequently repeated, power saving cannot be executed in the empty time during the shifting and the returning. Consequently, sufficient power saving cannot be executed.

SUMMARY OF THE INVENTION

In a preferred embodiment of the present invention, there is provided a data transferring system and an electronic apparatus providing the data transferring system in which larger power saving can be executed compared with a conventional system in image data transfer based on the PCI Express standard.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a data transferring system and an electronic apparatus providing the data transferring system particularly pointed out in the specification in such full, clear, concise, and exact terms as to enable a person having ordinary skill in the art to practice the invention.

To achieve these and other advantages in accordance with the purpose of the present invention, according to one aspect of the present invention, there is provided a data transferring system that transfers image data based on the PCI Express standard by synchronizing with a line synchronizing signal or a frame synchronizing signal. The data transferring system includes a packet gathering unit that transfers the image data (packets) by causing a period between the packets to be transferred in one cycle of the synchronizing signal to be shorter than a time that is required to transit from a link state L0 to a link state L0s and from the link state L0s to the link state L0.

According to another aspect of the present invention, there is provided a data transferring system that provides a plurality of data transferring devices each of which transfers image data based on the PCI Express standard by synchronizing with a line synchronizing signal or a frame synchronizing signal and that transfers a plurality of image data from the plural data transferring devices in parallel. The data transferring system includes a packet gathering unit that makes the image data (packets) to be transferred by one of the data transferring devices a transfer reference, delays transferring time of the image data of the other data transferring devices to be transferred before transferring the image data of the transfer reference, and makes a period between the packets to be transferred from the data transferring devices to be shorter than a time that is required to transit from a link state L0 to a link state L0s and from the link state L0s to the link state L0.

[Effect of the Invention]

According to embodiments of the present invention, transit periods from a link state L0 to a link state L0s and from the link state L0s to the link state L0 are reduced and the period of the link state L0s is increased. Therefore, the power saving can be realized compared with the conventional system.

BRIEF DESCRIPTION OF THE DRAWINGS

Other objects, features and advantages of the present invention will become more apparent from the following detailed description when read in conjunction with the accompanying drawings, in which:

FIG. 14 is a diagram explaining a definition of link states L0, L0s, L1, and L2;

FIG. 15 is a timing chart showing a control example of power source management in the link states;

FIG. 19A is the timing chart shown in FIG. 18B in which details are shown;

FIG. 19B is a timing chart in the data transferring device according to a modified example of the first embodiment of the present invention;

FIG. 21A is a timing chart in conventional data transfer based on the PCI Express standard; and FIG. 21B is a timing chart in the data transferring device according to the second embodiment of the present invention.

DESCRIPTION OF THE PREFERRED EMBODIMENTS

[Best Mode of Carrying Out the Invention]

A best mode of carrying out the present invention is described with reference to the accompanying drawings.

In the following, first, details of the PCI Express standard are explained in "Outline of the PCI Express Standard" to "Details of Architecture of PCI Express", and subsequently, "Digital Copying Machine" according to an embodiment of the present invention is explained.

[Outline of the PCI Express Standard]

The embodiment of the present invention utilizes PCI Express being one of the high speed serial buses, and as a premise of the embodiment of the present invention, the outline of the PCI Express Standard is explained by using an extract of Non-Patent Document 1. In this, the high speed serial bus signifies an interface that can transmit data in a high speed (approximately over 100 Mbps) by serial transmission with the use of one transmission line.

PCI Express is a bus standardized as a standard extended bus capable of being used in all computers as a successor to PCI, and has features, such as low voltage differential signal transmission, independent communication channels for reception and transmission in point to point, packetized split transaction, and high scalability depending on difference of link structures.

Figure 1:
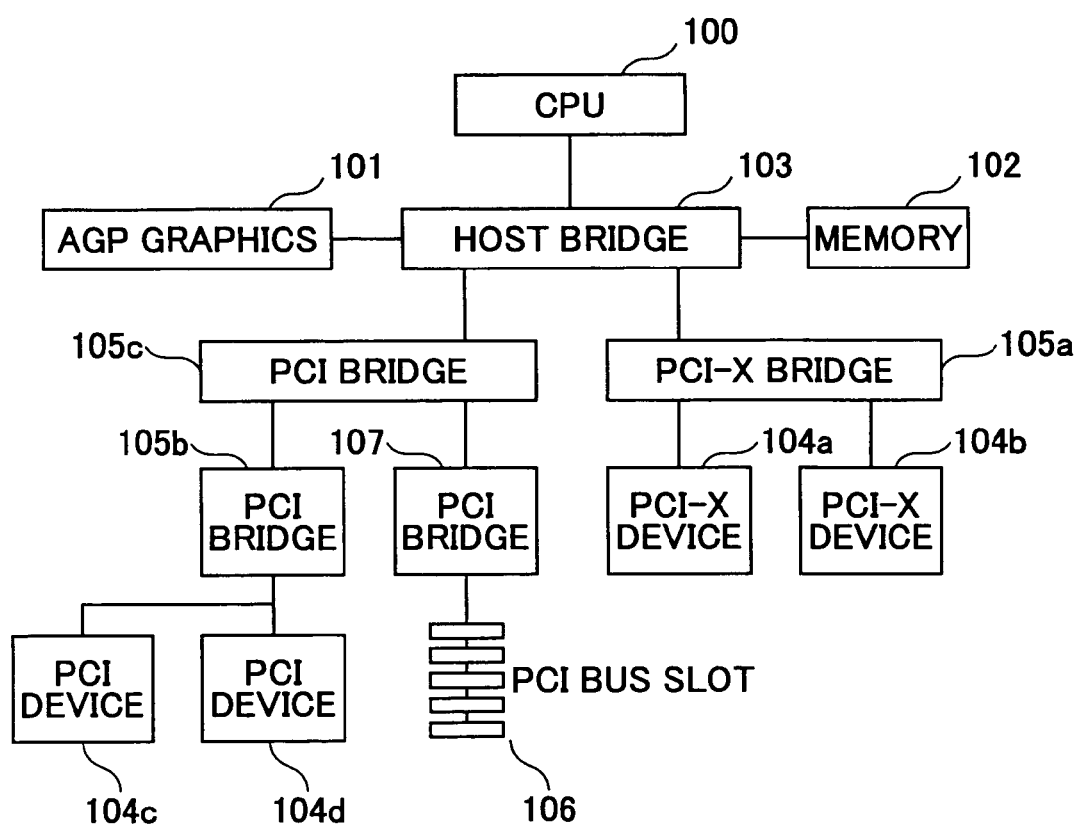
FIG. 1 is a block diagram showing a configuration of an existing PCI system.
Figure 2:
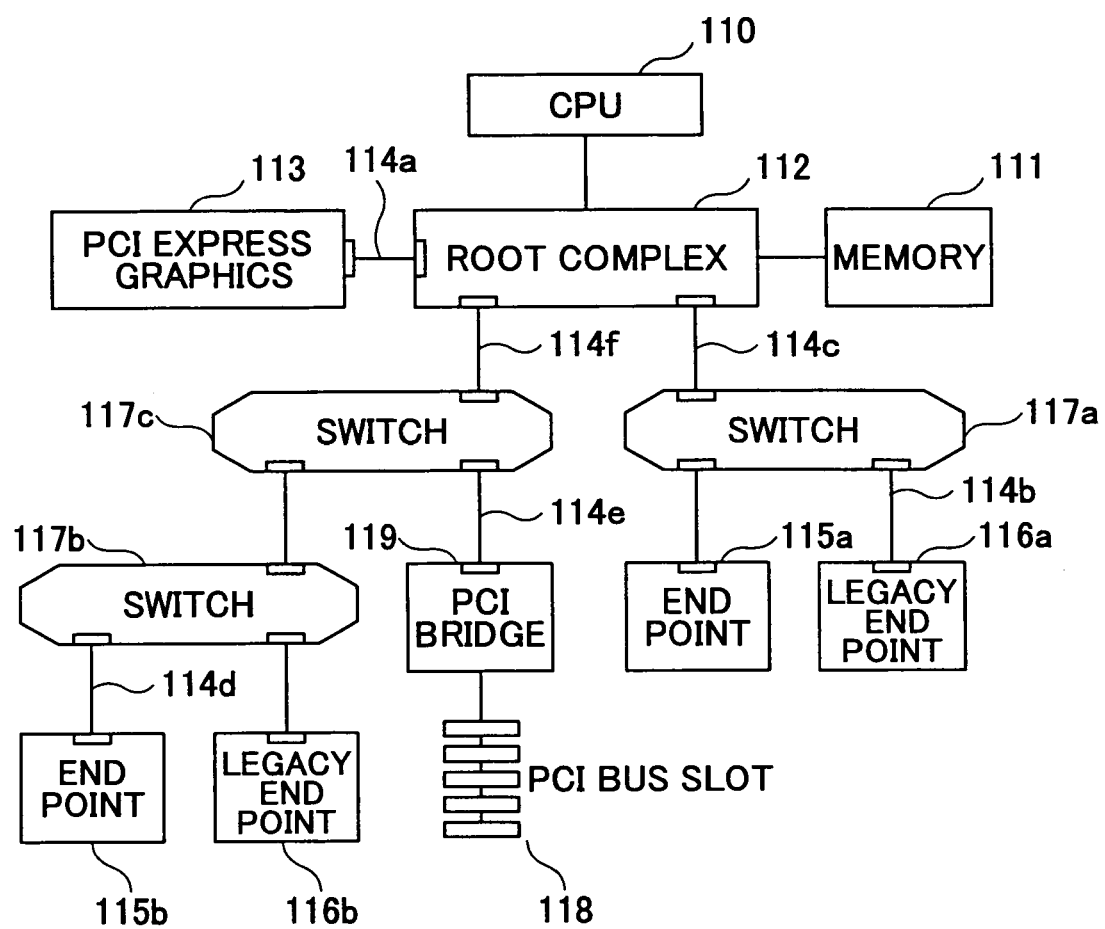
FIG. 2 is a block diagram showing a configuration of a PCI Express system.

FIG. 1 is a block diagram showing a configuration of an existing PCI system. FIG. 2 is a block diagram showing a configuration of a PCI Express system. In the existing PCI system shown in FIG. 1, a tree structure is formed. In the tree structure, PCI-X devices 104a and 104b (of the upward compatibility standard of PCI) are connected to a host bridge 103, to which a CPU 100, an AGP graphics 101, and a memory 102 are connected, via a PCI-X bridge 105a. Further, a PCI bridge 105b to which PCI devices 104c and 104d are connected and a PCI bridge 107 to which PCI bus slots 106 are connected are connected to the host bridge 103 via a PCI bridge 105c.

In the PCI Express system shown in FIG. 2, a tree structure is also formed. In the tree structure, a PCI Express graphics (port) 113 is connected to a root complex 112, to which a CPU 110 and a memory 111 are connected, by a PCI Express link 114a; a switch 117a, to which an end point 115a and a legacy end point 116a are connected by PCI Express links 114b, is connected to the root complex 112 by a PCI Express link 114c; a switch 117b, to which an end point 115b and a legacy end point 116b are connected by PCI Express links 114d, and a PCI bridge 119, to which PCI bus slots 118 are connected, are connected to a switch 117c by PCI Express links 114e; and the switch 117c is connected to the root complex 112 by a PCI Express link 114f.

Figure 3:
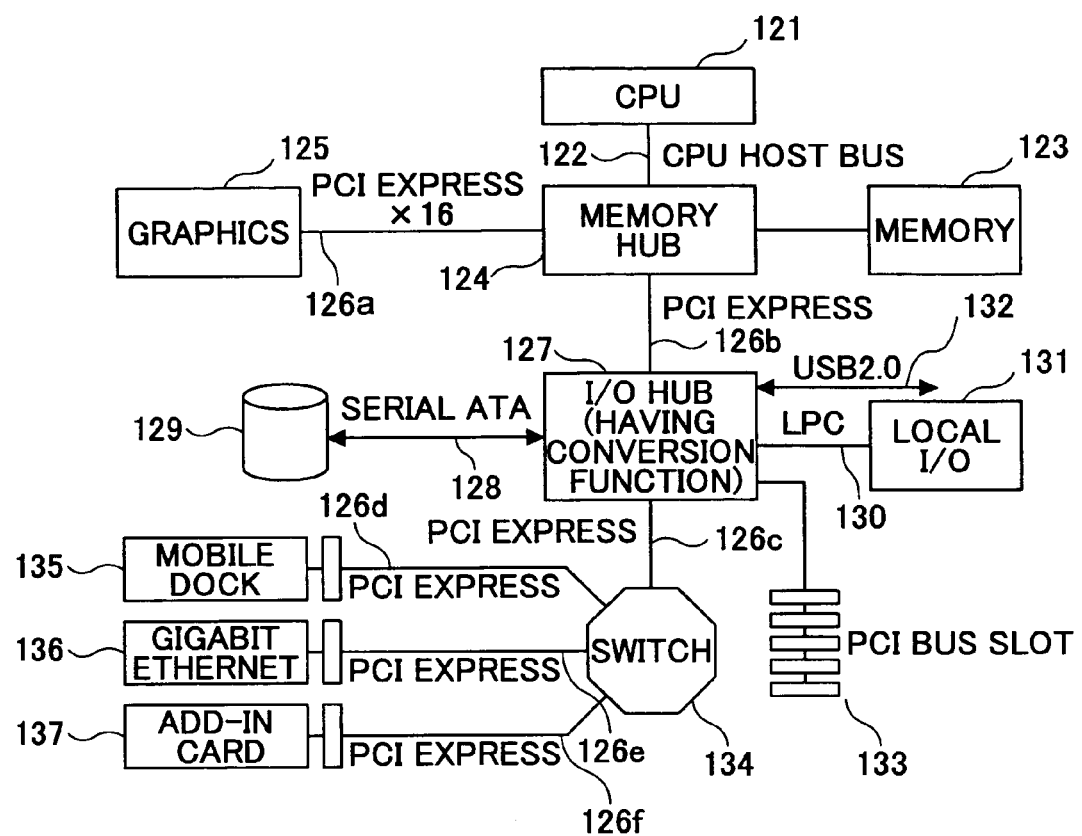
FIG. 3 is a block diagram showing a PCI Express platform in a desktop/a mobile computer.

FIG. 3 is a block diagram showing a PCI Express platform in a desktop/a mobile computer. The PCI Express platform shown in FIG. 3 is an example which is assumed to be actually used. In FIG. 3, a CPU 121 is connected to a memory hub 124 (corresponding to a root complex), to which a memory 123 is connected, by a CPU host bus 122. A graphics (port) 125 is connected to the memory hub 124 by a PCI Express link 126a of ×16. An I/O hub 127 having a conversion function is connected to the memory hub 124 by a PCI Express link 126a. Storage 129 is connected to the I/O hub 127 by, for example, a serial ATA (serial AT attachment) 128. A local I/O 131 is connected to the I/O hub 127 by an LPC (low pin count) connector 130, and a USB 2.0 132 and PCI bus slots 133 are connected to the I/O hub 127. Further, a switch 134 is connected to the I/O hub 127 by a PCI Express link 126c, a mobile dock 135 is connected to the switch 134 by a PCI Express link 126d, a gigabit Ethernet LAN 136 is connected to the switch 134 by a PCI Express link 126e, and an add-in card 137 is connected to the switch 134 by a PCI Express link 126f.

That is, in the PCI Express system, conventional buses, such as a PCI bus, a PCI-X bus, and an AGP bus are replaced by the PCI Express buses, and bridges (not shown) are used to connect the existing PCI/PCI-X devices. The connections between chip sets are executed by PCI Express connections, and existing buses, such as an IEEE 1394 (not shown), the Serial ATA 128, and the USB 2.0 132 are connected to the PCI Express buses by the I/O hub 127.

[Configuration Elements of PCI Express]

A. Port/Lane/Link

Figure 4:
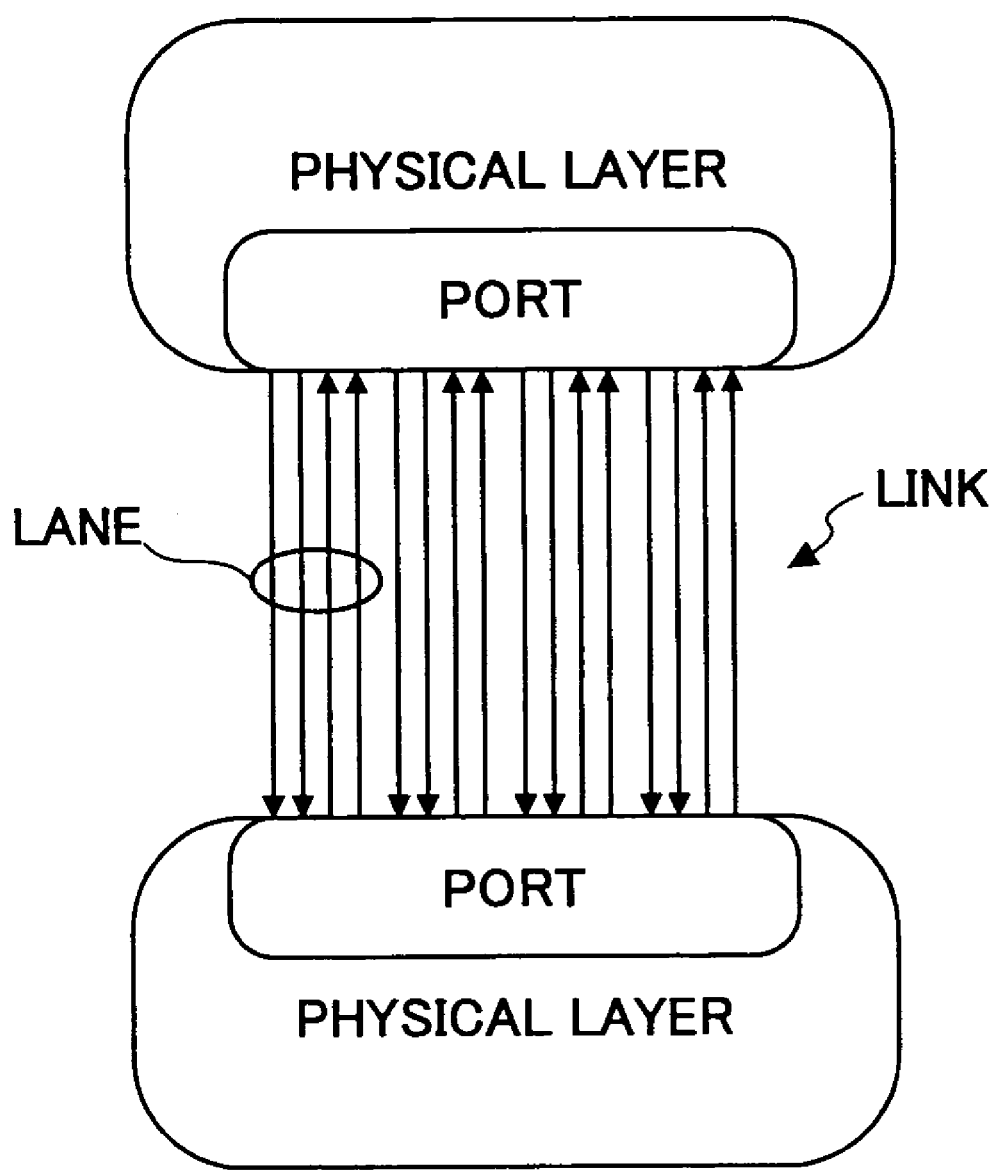
FIG. 4 is a schematic diagram showing a configuration of physical layers in a case of N=×4 (N is the number of lanes of which a link is composed)
Figure 5:
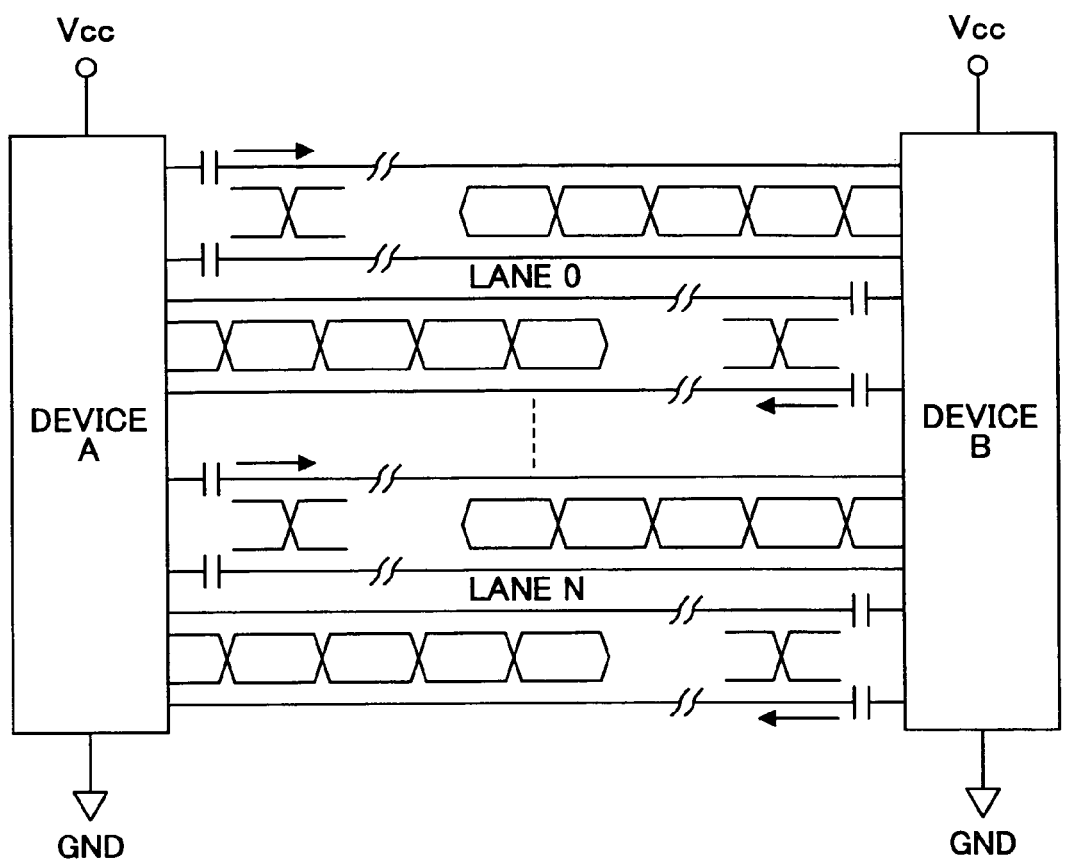
FIG. 5 is a schematic diagram showing a lane connection example between devices.

FIG. 4 is a schematic diagram showing a configuration of physical layers in a case of N=×4 (N is described below). Ports are physically in the same semiconductor device and are a set of transmitters/receivers forming links and signify interfaces which connect components logically one to one (point to point). The transfer rate is, for example, 2.5 Gbps in one direction (for the future, 5 Gbps and 10 Gbps are assumed). A lane is a set of two pairs of differential signals of, for example, 0.8 V, and is composed of a pair of transmission side signals (2 pieces) and a pair of reception side signals (2 pieces). A link is a group of lanes connecting the two ports and a dual simplex communication bus between components (devices). A "×N link" is composed of N lanes and N=1, 2, 4, 8, 16, and 32 are defined in the current standard. In FIG. 4, a case of ×4 link is shown. FIG. 5 is a schematic diagram showing a lane connection example between devices. As shown in FIG. 5, when the lane width N connecting devices A and B is variable, a scalable band width can be obtained.

B. Root Complex

The root complex 112 (refer to FIG. 2) is located in the upper most position of the I/O structure and connects a CPU and a memory subsystem to I/Os. In many cases, as shown in FIG. 3, the root complex is described as a memory hub in a block diagram. The root complex 112 (the memory hub 124) has one or more PCI Express ports (root ports), and each PCI Express port forms an independent I/O layer domain. In FIG. 2, rectangles in the root complex 112 are the PCI Express ports. The I/O layer domain may be a simple end point (for example, a case of the side of the end point 115a in FIG. 2) or may be formed by many switches and end points (for example, a case of the side of the end point 115b and the switches 117b and 117c).

C. End Point

The end point (115, 116) is a device which has a configuration space header of type 00h and is specifically a device other than a bridge. There are a legacy end point and a PCI Express end point (simply an end point) in the end points. The PCI Express end point is a BAR (base address register) and basically does not request an I/O port resource or an I/O request due to this. Further, the PCI Express end point does not support a lock request. The above are big differences between the legacy end point and the PCI Express end point.

D. Switch

Figure 6:
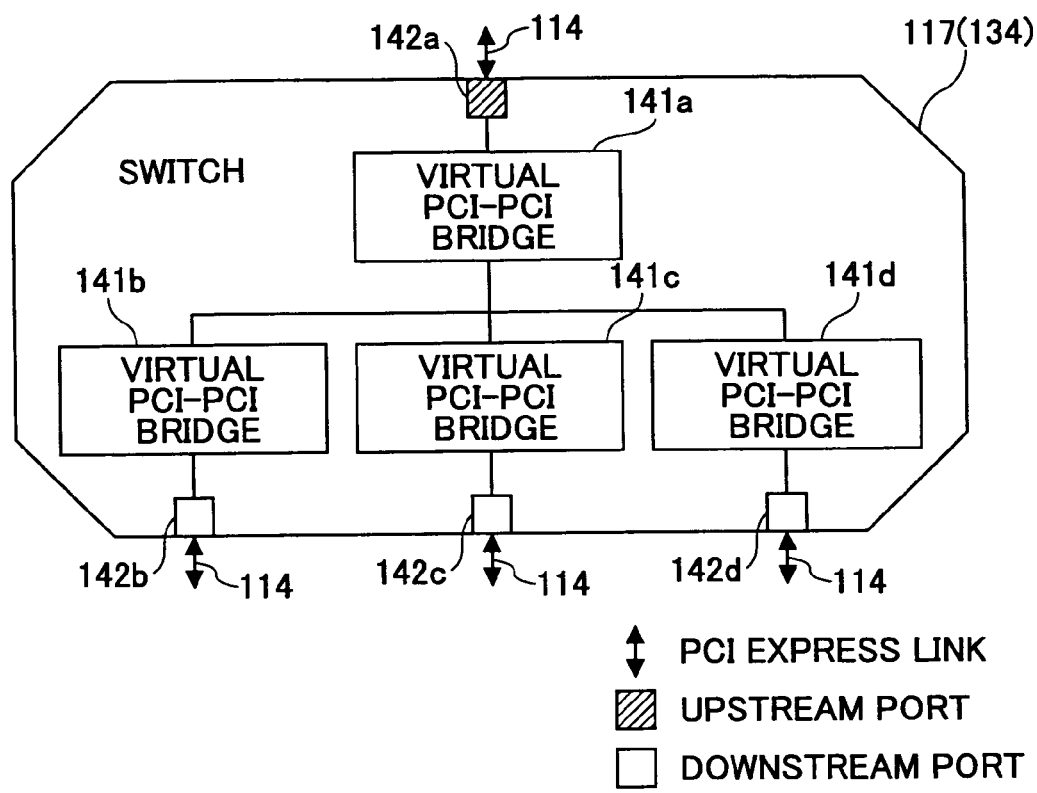
FIG. 6 is a block diagram showing an example of a logical structure of a switch.

The switch (117, 134) connects two or more ports and executes packet routing among the ports. FIG. 6 is a block diagram showing an example of a logical structure of the switch. As shown in FIG. 6, the switch is recognized as a group of virtual PCI-PCI bridges 141 (141a to 141d) from configuration software. In FIG. 6, arrows show the PCI Express links 114, 126 (114b to 114f, 126c to 126f) and the reference numbers 142a to 142d show ports. The port 142a is an upstream port near the root complex and the ports 142b to 142d are downstream ports far from the root complex.

E. PCI Express Link 114e to PCI Bridge 119

The PCI Express link 114e to the PCI bridge 119 gives a connection from PCI Express to PCI/PCI-X. With this, the existing PCI/PCI-X devices can be used on the PCI Express system.

[Layered Architecture]

Figure 7A:
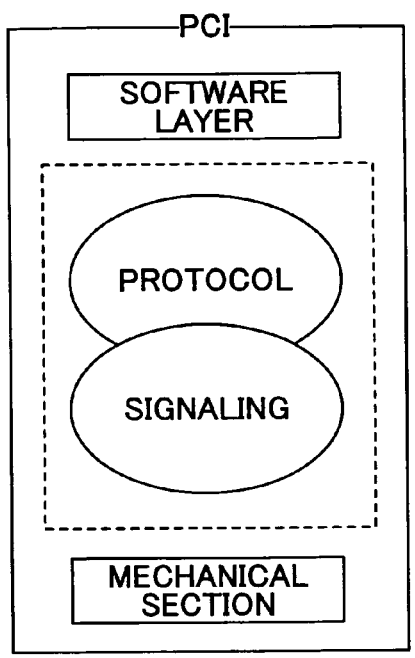
FIG. 7A is a block diagram showing existing PCI architecture.
Figure 7B:
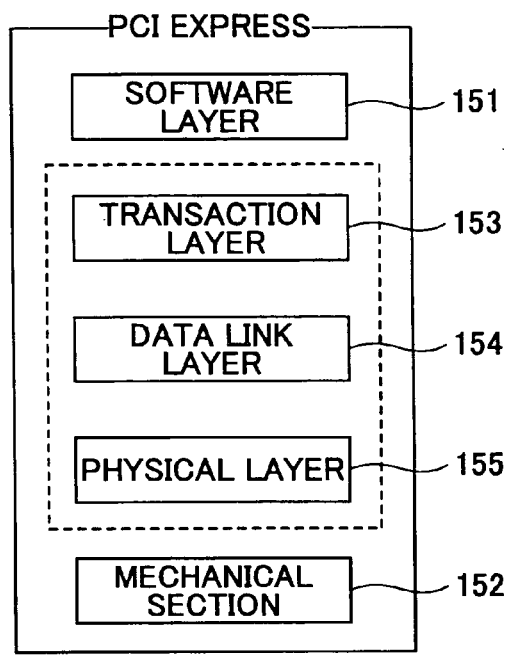
FIG. 7B is a block diagram showing PCI Express architecture.

FIG. 7A is a block diagram showing existing PCI architecture. FIG. 7B is a block diagram showing PCI Express architecture. As shown in FIG. 7A, the existing PCI architecture has a structure in which the protocol closely relates to the signaling and does not have the concept of layers. However, as shown in FIG. 7B, the PCI Express architecture has a layered structure and the specification of each layer is defined, similar to the general communication protocol and InfiniBand (registered trademark). That is, the PCI Express architecture has a structure in which a transaction layer 153, a data link layer 154, and a physical layer 155 are disposed between a software layer 151 located in the uppermost position and a mechanical section 152 located in the lowest position. With this structure, the module property of each layer is secured, scalability can be given, and each module can be reused. For example, when a new signal coding system is used or a new transmission medium is used, the data link layer 154 and the transaction layer 153 can be used as they are and only the physical layer 155 is changed.

Figure 8:
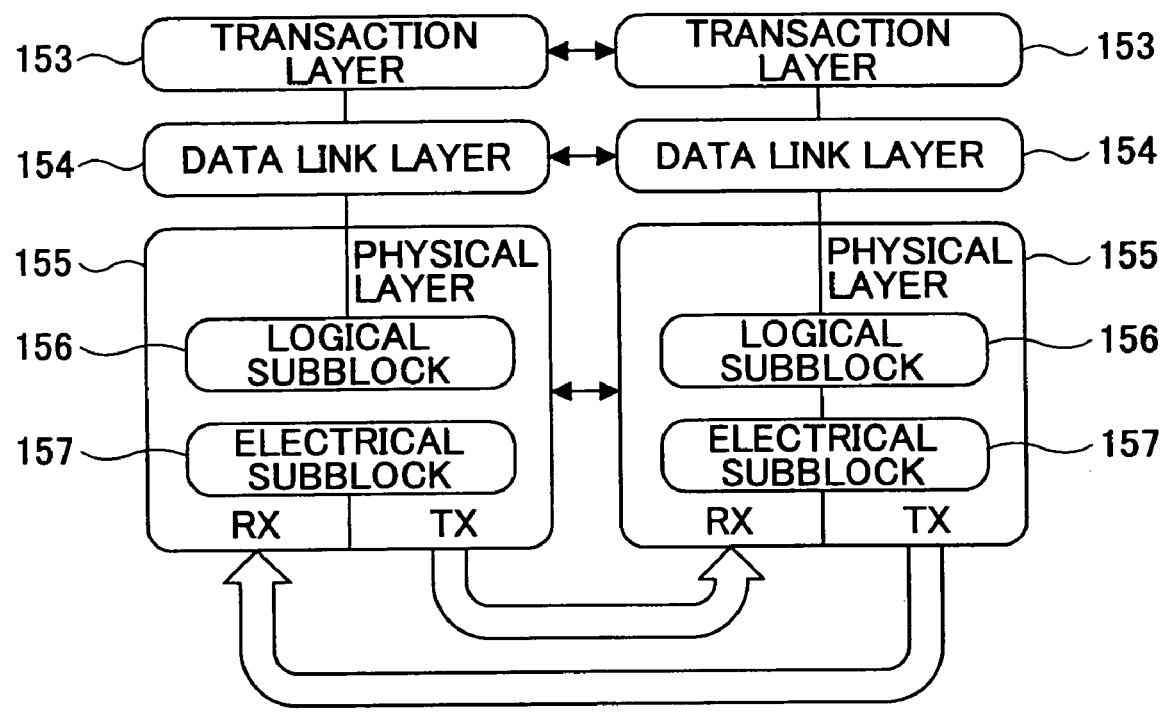
FIG. 8 is a block diagram showing a layered structure of the PCI Express architecture.

The center of the PCI Express architecture is the transaction layer 153, the data link layer 154, and the physical layer 155. Referring to FIG. 8, each layer is explained. FIG. 8 is a block diagram showing the layered structure of the PCI Express architecture.

A. Transaction Layer 153

Figure 9:
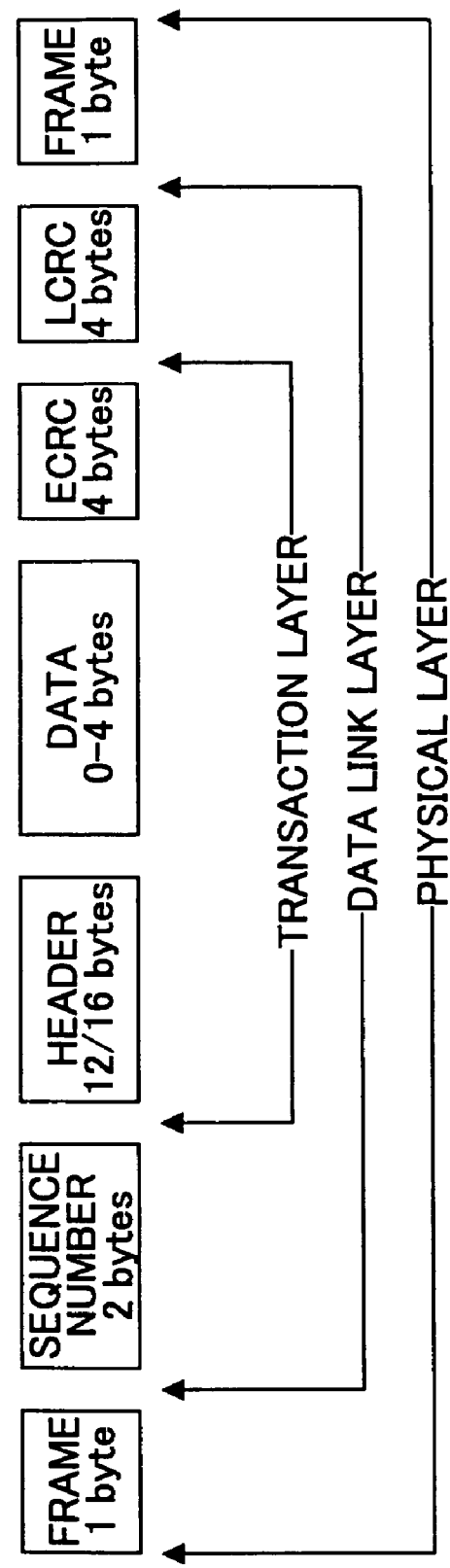
FIG. 9 is a diagram showing a format example of a TLP (transaction layer packet)

The transaction layer 153 is located in the uppermost position and has a function that assembles and separates TLPs (transaction layer packets). The TLP is used for transference of transactions, such as read/write, and various events. In addition, the transaction layer 153 executes flow control using a credit for the TLP. FIG. 9 is a diagram showing a format example of the TLP. In FIG. 9, an outline of the TLP is shown in relation to the layers 153 to 155. The details of the TLP are explained below.

B. Data Link Layer 154

The main role of the data link layer 154 is to ensure data completeness of the TLP by error detection/correction (retransmission) and execute link management. Exchanging packets for the link management and the flow control are executed between the data link layers 154. These packets are called DLLPs (data link layer packets) so as to distinguish them from the TLPs.

C. Physical Layer 155

The physical layer 155 includes circuits necessary for interface operations, such as a driver, an input buffer, a parallel to serial/serial to parallel converter, a PLL circuit, and an impedance matching circuit. In addition, the physical layer 155 has a function to initialize/maintain the interface as a logic function. Further, the physical layer 155 has a role which makes the data link layer 154/the transaction layer 153 independent from signal technology being used in the actual link.

In this, a technology called an embedded clock is used for a hardware structure of PCI Express, where timing of the clock is embedded in data signals without using clock signals, and a clock is extracted based on a cross point of data signals at the reception side.

[Configuration Space]

Figure 10:
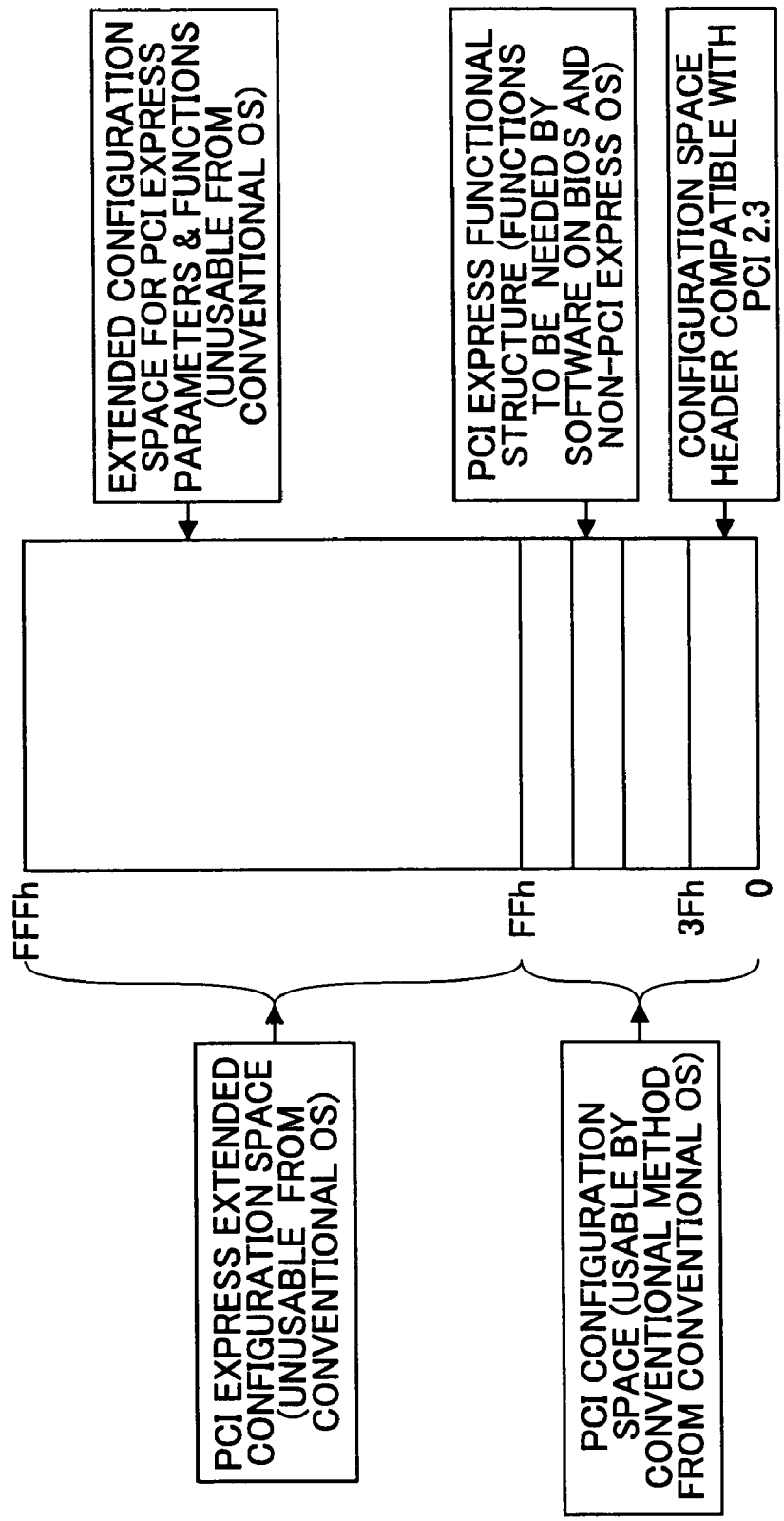
FIG. 10 is a diagram showing a configuration memory space of PCI Express.

FIG. 10 is a diagram showing a configuration memory space of PCI Express. PCI Express has a configuration space like the conventional PCI, the configuration space of the conventional PCI is 256 bytes; however, as shown in FIG. 10, the configuration space of the PCI Express is extended to 4096 bytes. With this configuration space, enough space is secured for a device such as a host bridge which will need many device intrinsic register sets in the future. In PCI Express, access to the configuration space is executed by access (configuration read/write) to a flat memory space, and bus/device/function/register numbers are mapped in a memory register.

From a BIOS or a conventional OS, a method using an I/O port can access the first 256 bytes in the configuration space, as a PCI configuration space. A function which converts conventional access into PCI Express access is installed in the host bridge. The range from 00h to 3Fh is a configuration header compatible with PCI 2.3. With this, a conventional OS and software can be used as they are except for functions extended by PCI Express. That is, the software layer 151 in PCI Express succeeds to load/store architecture (a processor directly accesses an I/O register) which maintains the compatibility with the existing PCI. However, when functions extended by PCI Express, such as synchronized transfer, RAS (reliability, availability, and serviceability) functions, are used, it is required to access the PCI Express extended space of 4 K bytes.

In this, as PCI Express, various form factors are assumed; however, as specific examples, there are an add-in card, a plug-in card (Express card), a mini PCI Express card, and so on.

[Details of PCI Express Architecture]

The transaction layer 153, the data link layer 154, and the physical layer 155 being the center of the PCI Express architecture are explained in detail.

A. Transaction Layer 153

As described above, the main role of the transaction layer 153 is to assemble and separate TLPs between the upper software layer 151 and the lower data link layer 154.

Aa. Address Space and Transaction Type

In PCI Express, in addition to a memory space (for data transfer to another memory space), an I/O space (for data transfer to another I/O space), a configuration space (for setting up and configuration of a device), which are supported by the conventional PCI, a message space is added, that is, four address spaces are defined. The message space is used for transmission (exchange) of messages, such as event notification in band and a general message between devices of PCI Express, and an interrupt request and acknowledgement is transferred by using the message as a virtual wire. Further, a transaction type is defined in each of the address spaces. The memory space, the I/O space, and the configuration space are read/write types, and the message space is a basic type (including a vendor definition).

Ab. TLP (Transaction Layer Packet)

PCI Express executes communications in a packet unit. In the format of the TLP shown in FIG. 9, the length of the header is 3DW (DW signifies double words and 3DW is 12 bytes) or 4DW (16 bytes). In the header, information, such as the format of the TLP (the length of the header and the existence of a payload), the transaction type, a traffic class (TL), an attribute, and a payload length, is included. The maximum payload length in a packet is 1024 DW (4096 bytes).

ECRC is used to ensure the completeness of data in end to end, and is 32 bits CRC in a part of the TLP. When in a switch, if an error occurs in the TLP, the error cannot be detected by LCRC (link. CRC) because the LCRC is recalculated in the TLP where the error occurs; therefore, the ECRC is installed.

In requests, there is a request that needs a complete packet and a request that does not need the complete packet.

Ac. TC (Traffic Class) and VC (Virtual Channel)

Upper software can give priority to traffic by using the TC. For example, transferring image data can be given priority in transferring the image data and network data. The TC has eight classes TC0 to TC7.

Figure 11:
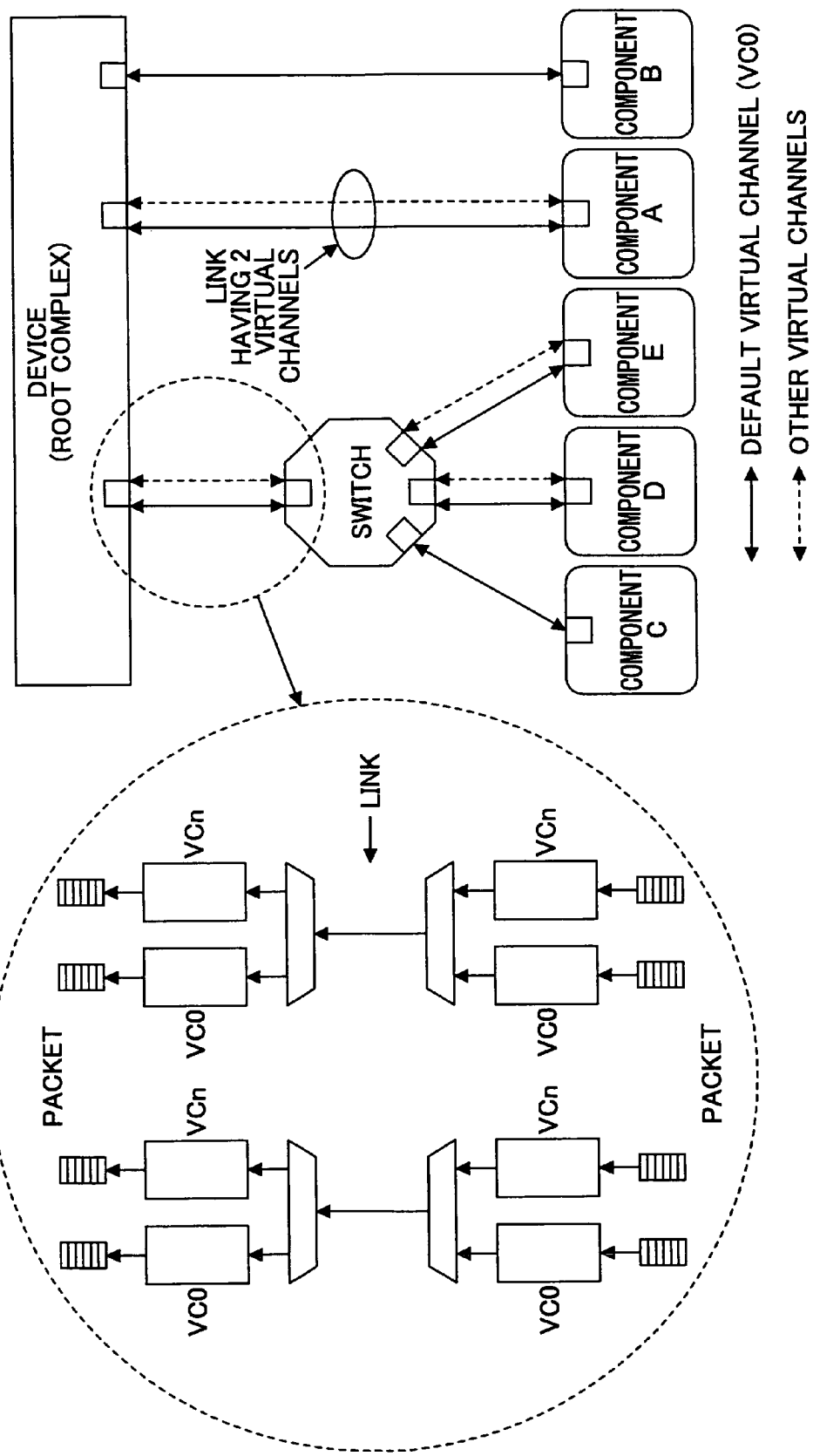
FIG. 11 is a schematic diagram explaining a concept of virtual channels.

Each of VCs is an independent virtual communication bus and has a resource (buffer and queue). The independent virtual communication buses are mechanisms which use plural independent data flow buffers using the same link in common. FIG. 11 is a schematic diagram explaining the concept of the VCs. As shown in FIG. 11, the VCs execute independent flow control. Even when a buffer of a VC is full, data can be transferred by another VC. That is, one link can be effectively used by dividing the physical one link into plural VCs. For example, as shown in FIG. 11, in a case where a link from a root complex (device) is divided into plural devices (components) via a switch, priority of traffic to each device (component) can be controlled. VC0 is indispensable and other VCs (VC1 to VC7) are installed corresponding to a tradeoff of cost and performance. In FIG. 11, a continuous arrow line shows a default VC (VC0) and a broken arrow line shows other VCs (VC1 to VC7).

In the transaction layer 153, the TC is mapped on the VC. When the number of VCs is small, one or more TCs can be mapped on one VC. In a simple case, it is considered that each TC is mapped on each VC one to one and all TCs are mapped on the VC0. The mapping of TC0 on VC0 is indispensable (fixed), and the other mapping is controlled by the upper software. The software can control the priority by utilizing the TCs.

Ad. Flow Control

FC (flow control) is executed to establish transfer order by avoiding an overflow in a reception buffer. The flow control is executed point to point between links, not end to end. Consequently, a packet reaching a final destination (completer) cannot be acknowledged by the flow control.

The flow control in PCI Express is executed by a credit base. That is, the following mechanism is used. The empty state of a reception side buffer is confirmed before starting the data transmission and overflow and underflow in the buffer are avoided. In other words, the reception side notifies a transmission side of buffer capacity (credit value) at the time of initializing the link, and the transmission side compares the credit value with the length of packets to be transmitted. When the credit value has remaining capacity, the packets are transmitted. There are six types of credits.

Exchanging the information of the flow control is executed by using DLLP (data link layer packet) of the data link layer 154. The flow control is applied only to the TLP and is not applied to the DLLP. Therefore, the DLLP can always be transmitted/received.

B. Data Link Layer 154

As described above, the main role of the data link layer 154 is to provide an exchanging function of the TLPs between two components on a link with high reliability.

Ba. Handling of TLPs

The data link layer 154 adds a sequence number of 2 bytes to its head and an LCRC (link CRC) of 4 Bytes to its tail of the TLP received from the transaction layer 153, and gives it to the physical layer 155 (refer to FIG. 9). The TLPs are stored in a retry buffer and retransmitted to a destination until an acknowledgment is received from the destination. When transmission failure of the TLPs continues, the data link layer 154 decides that the link is abnormal and requires the physical layer 155 to execute retraining of the link. When the training of the link fails, the state of the data link layer 154 is shifted to be inactive.

The sequence number and the LCRC of the TLP received from the physical layer 155 of the transmission side are inspected, and when they are normal, the TLP is sent to the transaction layer 153; when they are abnormal, the reception side requires the transmission side to retransmit the TLP.

Bb. DLLP (Data Link Layer Packet)

A packet generated by the data link layer 154 is called a DLLP, and the DLLP is exchanged between the data link layers 154. The DLLP has the following types:

1. Ack/Nak (reception confirmation and retry (retransmission) of TLP)

2. InitFC1/InitFC2/UpdateFC (initialization and update of Flow Control)

3. Power Source Management

Figure 12:
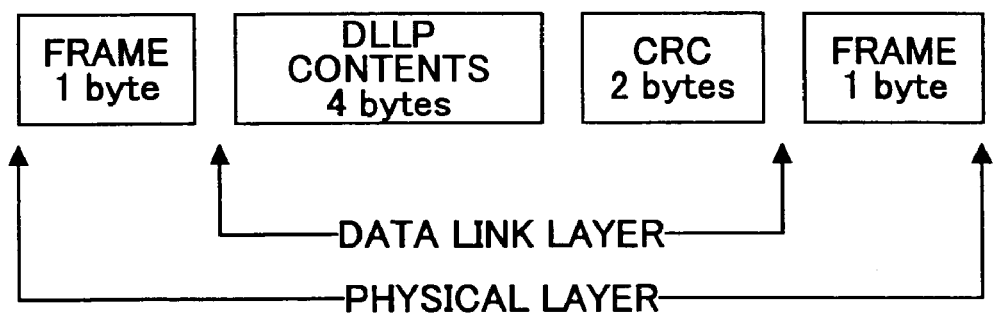
FIG. 12 is a diagram explaining a format example of a DLLP (data link layer packet)

FIG. 12 is a diagram explaining a format example of the DLLP. As shown in FIG. 12, the length of the DLLP is 6 bytes and is composed of DLLP contents of 4 bytes (a DLLP type of 1 byte for showing a type and intrinsic information of the type of 3 bytes) and a CRC of 2 bytes.

C. Logical Subblock 156 in Physical Layer 155

The main role of the logical subblock 156 in the physical layer 155 is to convert a packet received from the data link layer 154 into a packet which an electric subblock 157 can transmit (refer to FIG. 8). Further, the logical subblock 156 has a function of controlling/managing the physical layer 155.

Ca. Data Encoding and Parallel to Serial Conversion

Figure 13:
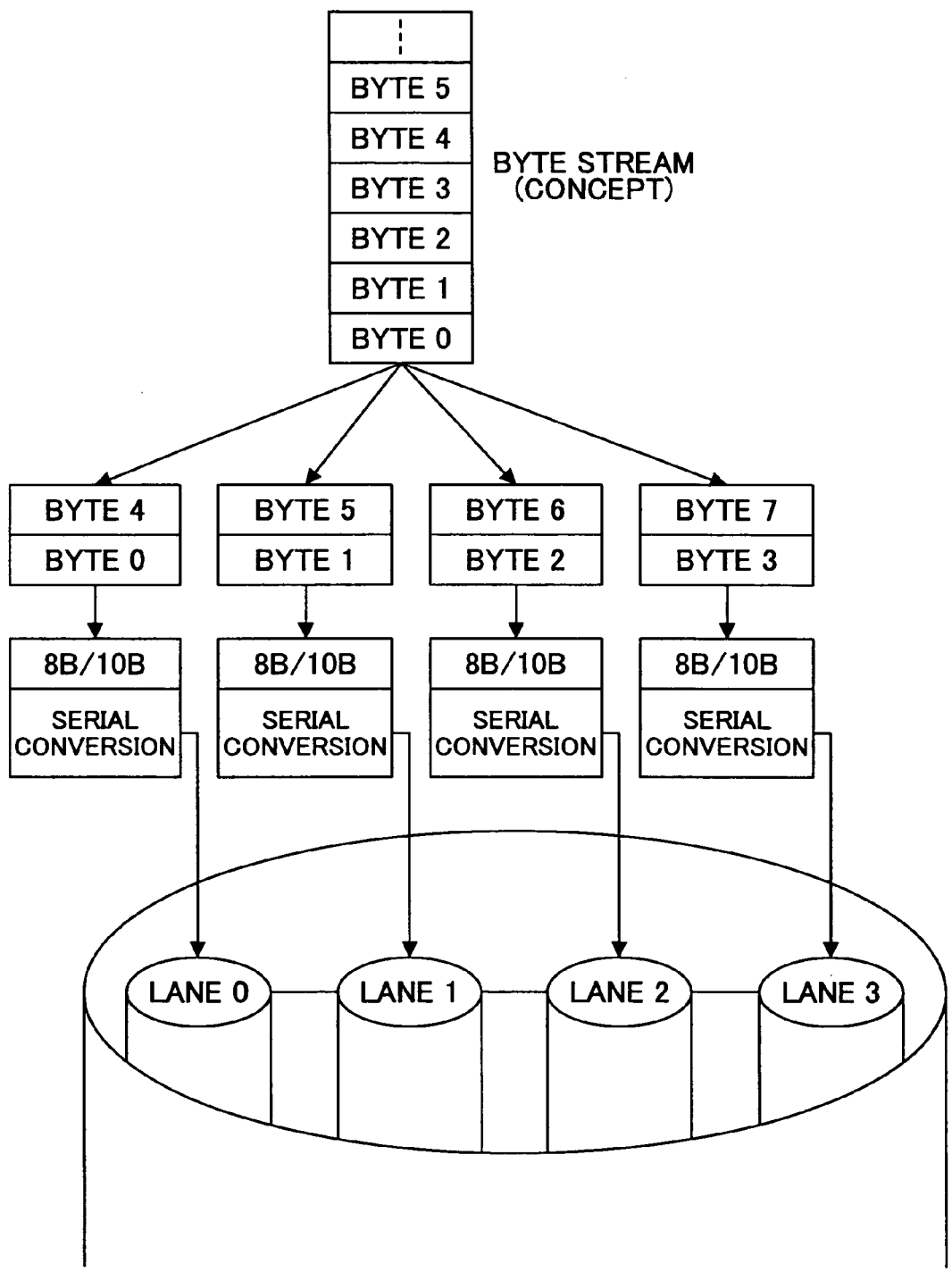
FIG. 13 is a schematic diagram showing a byte striping example in a ×4 link.

In PCI Express, in order not to remain in a sequence of "0"s or "1"s, that is, in order not to continue without a cross point for a long time, 8B/10B conversion is used for data encoding. FIG. 13 is a schematic diagram showing a byte striping example in a ×4 link. As shown in FIG. 13, serial conversion is applied to the converted data and data from an LSB are transmitted in order on the lane. When plural lanes exist (a case of the ×4 link is shown in FIG. 13), data are allocated to each lane in a byte unit before encoding. In this case, at first sight, this looks like a parallel bus; however, transferring is independently executed in each lane, consequently, skewing being a problem in the parallel bus can be greatly reduced.

Cb. Power Source Management and Link State

FIG. 14 is a diagram explaining the definition of link states L0, L0s, L1, and L2. As shown in FIG. 14, in order to make power consumption of links low, the link states L0, L0s, L1, and L2 are defined.

The link state L0 is a normal mode and the power consumption is gradually lowered when the link state is changed from the L0s to L2; however, time requiring to return to the link state L0 becomes longer. As described above, as shown in FIG. 15, when the power source management by hardware control is executed in addition to power source management by software control, the power consumption can be lowered to be as small as possible.

D. Electrical Subblock 157 in Physical Layer 155

The main role of the electrical subblock 157 in the physical layer 155 is to transmit data serialized by the logical subblock 156 to a lane, to receive data from a lane, and to send the received data to the logical subblock 156 (refer to FIG. 8).

Da. AC Coupling

A capacitor for AC coupling is mounted in the transmission side of the link. With this, it is not necessary that a DC common mode voltage be the same in the transmission side and the reception side. Therefore, in the transmission side and the reception side, mutually different designing, a different specification of a semiconductor device, and a different power voltage can be used.

Db. De-Emphasis

As described above, in PCI Express, by the 8B/10B encoding, data are processed so that a sequence of "0"s or "1"s does not persist. However, there is a case where a sequence of "0"s or "1"s persists (at maximum 5). In this case, it is stipulated that the transmission side execute de-emphasis transfer. When the same polarity bits continue, it is necessary that a noise margin of a signal received at the reception side be obtained by lowering the differential voltage level (amplitude) by 3.5±0.5 dB from the second bit. This is called the de-emphasis. By the frequency dependent attenuation in the transmission line, since changing bits have high frequency components, the waveform of the reception side becomes small by the attenuation; however, in unchanging bits, the high frequency components are few and the waveform of the reception side becomes relatively large. Therefore, the de-emphasis is applied to make the waveform at the reception side constant.

[Digital Copying Machine]

Next, a digital copying machine according to embodiments of the present invention is explained.

Figure 16:
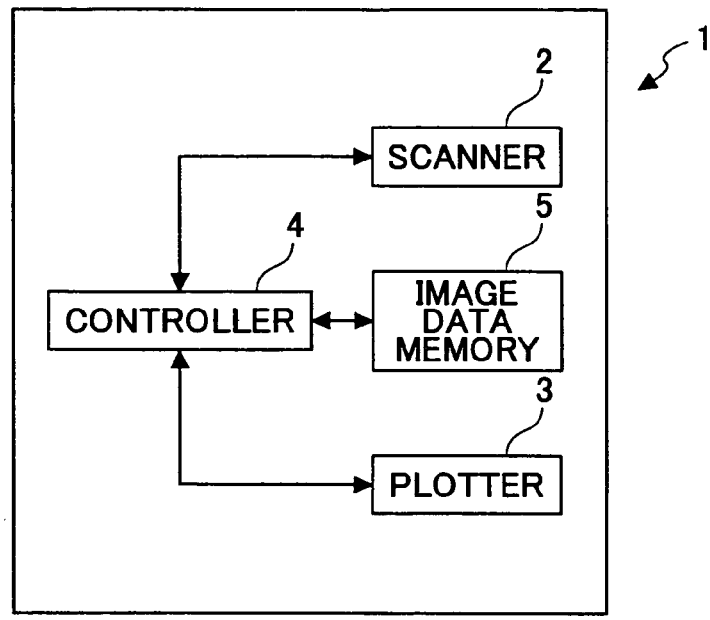
FIG. 16 is a block diagram showing a configuration of a digital copying machine according to embodiments of the present invention.

FIG. 16 is a block diagram showing a configuration of the digital copying machine according to the embodiments of the present invention. As shown in FIG. 16, a digital copying machine 1 according to the embodiments of the present invention includes a scanner 2 that reads image data of a manuscript, a plotter 3 that forms an image on a medium such as a paper based on the image data read by the scanner 1, a controller 4 that totally controls the digital copying machine 1, and an image data memory 5 that stores the image data. As printing systems of the image data by the plotter 3, there are various systems, such as, an electro-photographic system, an ink-jet system, a sublimation thermal transcription system, a sliver film photographic system, a direct thermo sensitive recording system, and a melting thermal transcription system, and any one of them can be used.

Figure 17:
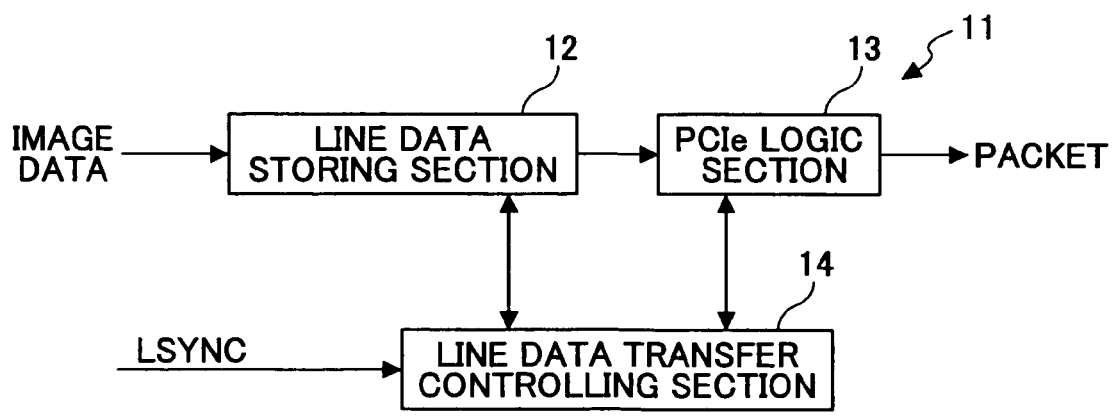
FIG. 17 is a block diagram showing a circuit configuration of a data transferring device which executes data transfer in a data transferring system according to a first embodiment of the present invention.

The digital copying machine 1 executes internal communications by using a data transferring system of the PCI Express standard. FIG. 17 is a block diagram showing a circuit configuration of a data transferring device 11 which executes data transfer in the data transferring system according to a first embodiment of the present invention. Configuration elements, such as the scanner 2, the plotter 3, the controller 4, and the image data memory 5 in the digital copying machine 1 mutually communicate by providing the data transferring device 11.

As shown in FIG. 17, the data transferring device 11 is composed of FIFO (first-in first-out) circuits and so on, and includes a line data storing section 12, a PCIe logic section 13, and a line data transfer controlling circuit 14. The line data storing section 12 temporarily stores input image data. The PCIe logic section 13 generates packets from the temporarily stored image data by using logic of the PCI Express standard and outputs the packets. The line data transfer controlling circuit 14 receives a line synchronizing signal LSYNC which transfers image data in each line and adjusts output timing of the packets by controlling the line data storing section 12 and the PCIe logic section 13. In this, a frame synchronizing signal which transfers the image data in each frame can be used instead of using the line synchronizing signal LSYNC. However, the embodiments of the present invention are explained by using the line synchronizing signal LSYNC.

Next, a first embodiment of the present invention is explained. In the first embodiment, processes which are executed by the data transferring device 11 are explained.

The data transferring device 11 transfers image data by synchronizing with the line synchronizing signal LSYNC in the PCI Express standard with the control of the line data transfer controlling circuit 14.

Figure 18A:
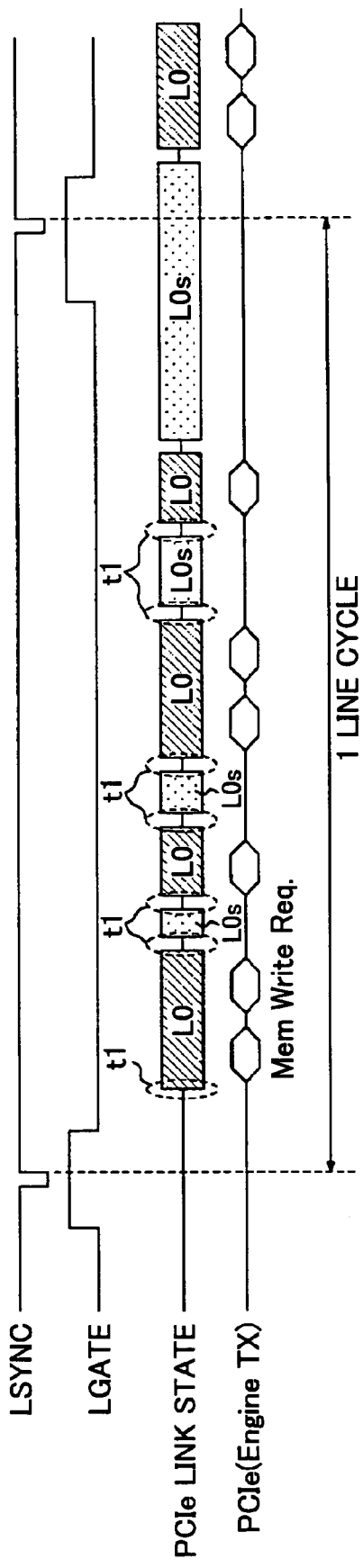
FIG. 18A is a timing chart in conventional data transfer based on the PCI Express standard.
Figure 18B:
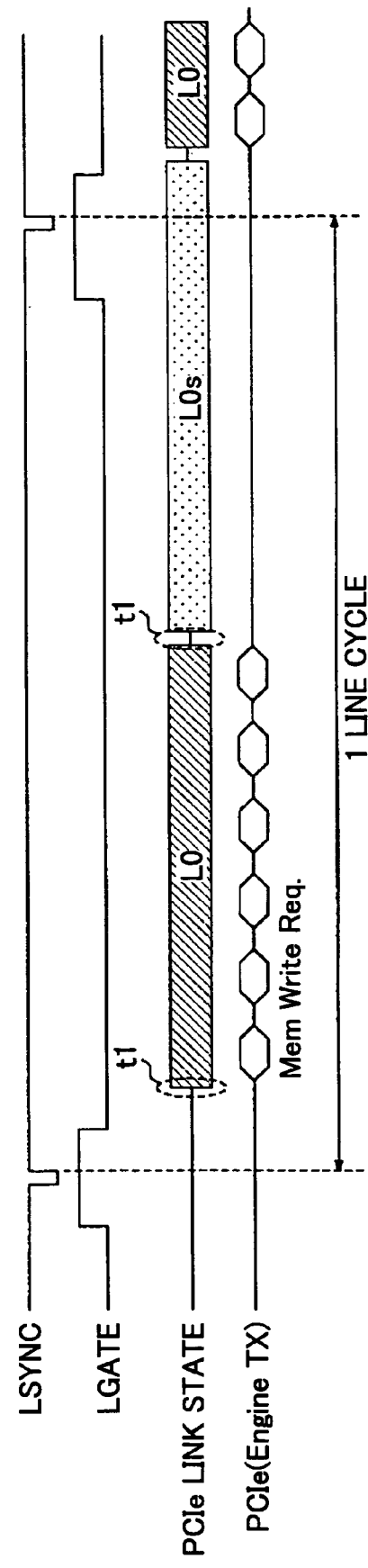
FIG. 18B is a timing chart in the data transferring device according to the first embodiment of the present invention.

FIG. 18A is a timing chart in conventional data transfer based on the PCI Express standard. FIG. 18B is a timing chart in the data transferring device 11 according to the first embodiment of the present invention.

In FIGS. 18A and 18B, "LSYNC" is the line synchronizing signal as described above, "LGATE" is a gate signal, "PCIe LINK STATE" shows a link state in the link states of the PCI Express standard, and "PCIe (Engine TX)" shows outputs of image data (packets). These are the same as those in FIGS. 19A and 19B.

In the conventional data transfer shown in FIG. 18A, in one line cycle of the line synchronizing signal LSYNC, packets (image data) are dispersedly output and are not controlled well. Therefore, the link state L0s enters positions between plural link states L0 in periods of outputting image data. Consequently, many transition periods "t1" from the link state L0 to the link state L0s and from the link state L0s to the link state L0 are generated before and after each link state L0s.

On the other hand, as shown in FIG. 18B, in the data transferring device 11 according to the first embodiment of the present invention, by the control of the line data transfer controlling circuit 14, the packets (image data) are transferred by causing a period between packets to be transferred in one line cycle of the line synchronizing signal LSYNC to be less than the time requiring to transit to the L0s state. This is a packet gathering unit.

With the above, in the first embodiment of the present invention, the number of the transition periods "t1" from the link state L0 to the link state L0s and from the link state L0s to link state L0 is reduced and the period of the L0s state in one line cycle is increased compared with the case shown in FIG. 18A. Therefore, the power saving can be realized compared with the conventional case.

Next, a modified example of the first embodiment of the present invention is explained.

FIG. 19A is the timing chart shown in FIG. 18B; however, explaining contents are different from those in FIG. 18B. FIG. 19B is a timing chart in the data transferring device 11 according to the modified example of the first embodiment of the present invention.

As described above, in FIG. 18B, the packets (image data) are transferred by causing a period between packets to be transferred in one line cycle of the line synchronizing signal LSYNC to be less than the time requiring to transit to the L0s state. However, as shown in FIG. 19A, there is still a period "t2" between the packets (image data) to be transferred even though the period "t2" is less than the time requiring to transit to the L0s state. The period "t2" does not contribute to the image data transfer and is included in the state L0.

In order to eliminate the period "t2", as shown in FIG. 19B, the period "t2" is made "0" by the control of the line data transfer controlling circuit 14. With this control, the period of the link state L0 is shortened and the period of the state L0s is made longer. Therefore, further power saving can be realized compared with the case shown in FIG. 18B.

In the embodiments, the packets (image data) to be transferred are, for example, memory write request packets output from the controller 4 to the image data memory 5 and memory read completion packets output from the image data memory 5 to the controller 4.

Next, a second embodiment of the present invention is explained.

Figure 20:
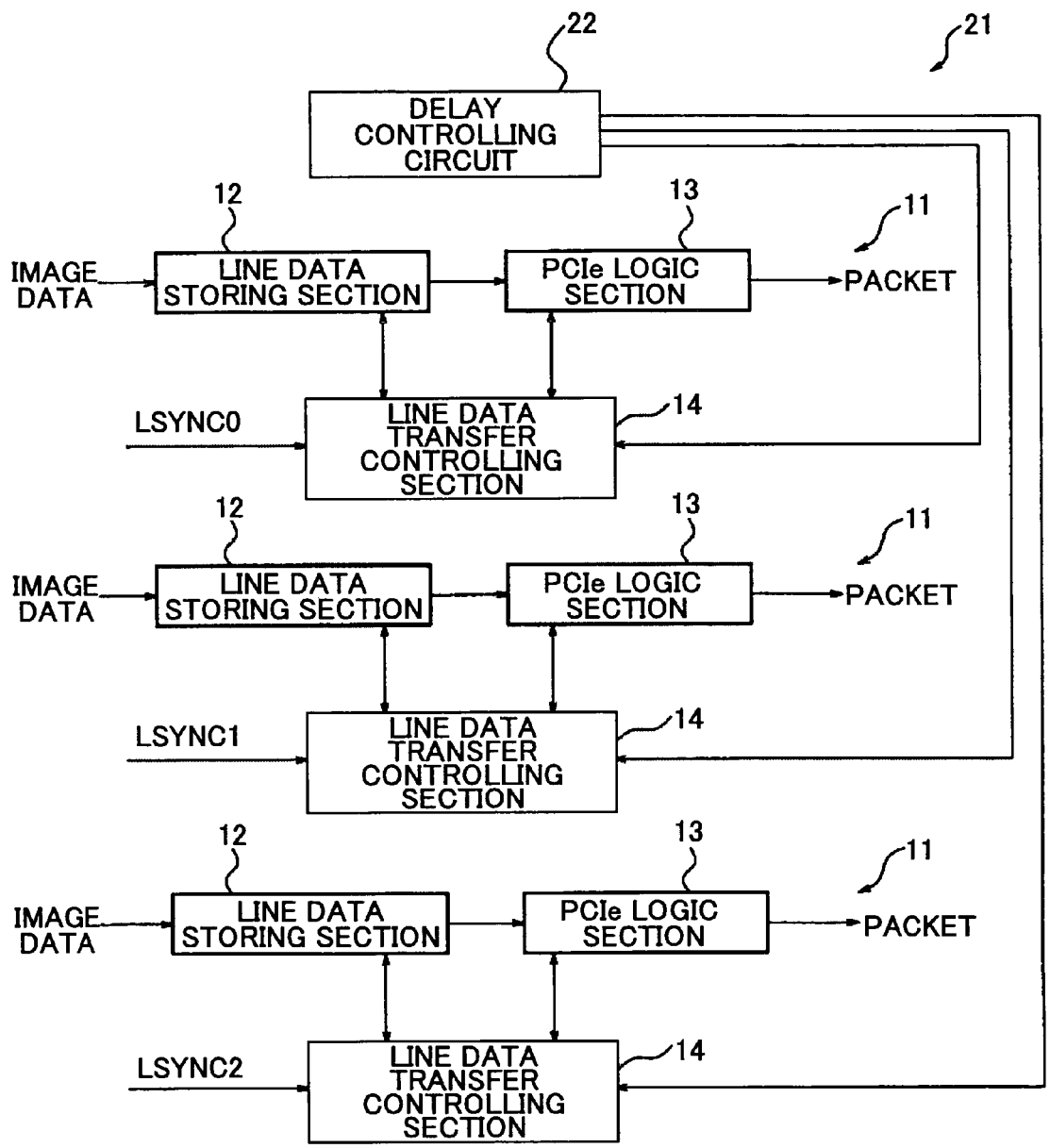
FIG. 20 is a block diagram showing a circuit configuration of another data transferring device which executes data transfer in a data transferring system according to a second embodiment of the present invention.

FIG. 20 is a block diagram showing a circuit configuration of a data transferring device 21 which executes data transfer in a data transferring system according to a second embodiment of the present invention. The data transferring device 21 includes plural data transferring devices 11 according to the first embodiment and a delay controlling circuit 22 that controls the line data transfer controlling circuits 14 in the data transferring devices 11. In the second embodiment shown in FIG. 20, as an example, three data transferring devices 11 are included in the data transferring device 21. Configuration elements in the data transferring device 11 are explained above; therefore, the same explanation is omitted.

As shown in FIG. 20, to each of the line data transfer controlling circuits 14, a different line synchronizing signal LSYNC (LSYNC0, LSYNC1, and LSYNC2 whose timings are different from each other) is input and packets (image data) are output from each of the data transferring devices 11. In this case, three packets (image data) are output from the data transferring device 21 in parallel and transferred.

FIG. 21A is a timing chart in conventional data transfer based on the PCI Express standard. FIG. 21B is a timing chart in the data transferring device 21 according to the second embodiment of the present invention.

In FIGS. 21A and 21B, packets (image data) (PCIe(Engine TX0 to Tx2)), which are output from the data transferring devices 11 by synchronizing with the line synchronizing signals LSYNC0, LSYNC1, and LSYNC2, are shown as Engine TX0, Engine TX1, and Engine TX2.

In a case of FIG. 21A, the image data Engine TX0, Engine TX1, and Engine TX2 are respectively output from the data transferring devices 11 by synchronizing with the line synchronizing signals LSYNC0, LSYNC1, and LSYNC2 without control. Therefore, as shown in FIG. 21A, between the periods of the link state L0 where the image data Engine TX0, Engine TX1, and Engine TX2 are output, many periods of the link state L0s occur, and before and after each link state L0s, many transition periods from the link state L0 to the link state L0s and from the link state L0s to the link state L0 are generated.

In order to solve this problem, in a case of FIG. 21B, the delay controlling circuit 22 delays the transferring time of one or two image data Engine TXns by making an image data Engine TXn' a transfer reference. In this case, by making the image data Engine TX2 the transfer reference, the transferring time of the other image data Engine TX0 and Engine TX1 transmitted before transmitting the image data Engine TX2 is delayed. With this, the period between the image data Engine TX0 and Engine TX1 and the period between the image data Engine TX1 and Engine TX2 are controlled to be shorter than the time which is required to transit to the link state L0s. This is also a packet gathering unit.

In the case of FIG. 21B, the period of the link state L0s can be longer by reducing the transition period from the link state L0 to the link state L0s and the transition period from the link state L0s to the link state L0 by gathering the link state L0 periods and the link state L0s periods, compared with the case of FIG. 21A.

In this case, when the period between the image data Engine TX0 and Engine TX1 and the period between the image data Engine TX1 and Engine TX2 are shorter than the time which is required to transit to the state L0s, it is allowable that the period between the image data TX0 and TX1 and the period between the image data TX1 and TX2 exist. However, as shown in FIG. 21B, when these periods are made "0", the period of the link state L0s can be further longer and power saving can be further achieved.

Further, the present invention is not limited to the specifically disclosed embodiments, and variations and modifications may be made without departing from the scope of the present invention.

The present invention is based on Japanese Priority Patent Application No. 2005-011262, filed on Jan. 19, 2005, with the Japanese Patent Office, the entire contents of which are hereby incorporated by reference.

What is claimed is:

1. A data transferring system that transfers image data based on the PCI Express standard by synchronizing with a line synchronizing signal or a frame synchronizing signal, comprising:

a first packet gathering unit configured to transfer first image data packets by causing a period between the first packets to be transferred in one cycle of the synchronizing signal to be shorter than a time that is required to transit from a link state L0 to a link state L0s and from the link state L0s to the link state L0;

a second packet gathering unit configured to transfer second image data packets by causing a period between the second packets to be transferred in one cycle of the synchronizing signal to be shorter than the time that is required to transit from the link state L0 to the link state L0s and from the link state L0s to the link state L0; and a delay controlling unit configured to control a delay between a last packet transferred by the first packet gathering unit and a first packet transferred by the second packet gathering unit to be shorter than the time that is required to transit from the link state L0 to the link state L0s.

2. The data transferring system as claimed in claim 1, wherein:

the first and second packets to be transferred are memory write request packets.

3. The data transferring system as claimed in claim 1, wherein:

the first and second packets to be transferred are memory read completion packets.

4. An electronic apparatus providing the data transferring system as claimed in claim 1.

5. The data transferring system as claimed in claim 1, wherein:

wherein the first packet gathering unit makes the period between the packets to be transferred "0".

6. The data transferring system as claimed in claim 1, wherein:

wherein the second packet gathering unit makes the period between the packets to be transferred "0".

* * * * *